(12) United States Patent
Chiproot

(10) Patent No.: US 11,280,436 B2
(45) Date of Patent: Mar. 22, 2022

(54) PIPE COUPLING WITH PROTECTION AGAINST FASTENER SHEARING

(71) Applicant: Krausz Industries Ltd., Tel Aviv (IL)

(72) Inventor: Avi Chiproot, Kfar-Saba (IL)

(73) Assignee: Krausz Industries Ltd., Rosh HaAyin (IL)

( * ) Notice: Subject to any disclaimer, the term of this patent is extended or adjusted under 35 U.S.C. 154(b) by 302 days.

(21) Appl. No.: 16/285,281

(22) Filed: Feb. 26, 2019

(65) Prior Publication Data

US 2020/0271255 A1    Aug. 27, 2020

(51) Int. Cl.
*F16L 23/16*    (2006.01)
*F16L 33/04*    (2006.01)

(52) U.S. Cl.
CPC .............. *F16L 23/16* (2013.01); *F16L 33/04* (2013.01)

(58) Field of Classification Search
CPC .................................. F16L 23/16; F16L 33/04
See application file for complete search history.

(56) References Cited

U.S. PATENT DOCUMENTS

| | | | | | |
|---|---|---|---|---|---|
| 3,700,008 | A | * | 10/1972 | Hackman | F16L 33/04 138/99 |
| 4,360,227 | A | * | 11/1982 | Bridges | F16L 21/06 277/616 |
| 5,286,064 | A | * | 2/1994 | Bridges | F16L 21/06 138/97 |
| 5,362,107 | A | * | 11/1994 | Bridges | F16L 21/06 138/97 |
| 5,765,876 | A | * | 6/1998 | Bridges | F16L 55/172 285/15 |
| 5,769,467 | A | * | 6/1998 | Bridges | F16L 21/022 285/370 |
| 2011/0095520 | A1 | * | 4/2011 | Krausz | F16L 21/065 285/37 |
| 2013/0154259 | A1 | * | 6/2013 | Chiproot | F16L 21/065 285/337 |
| 2014/0306449 | A1 | | 10/2014 | Prevot | |

FOREIGN PATENT DOCUMENTS

| | | |
|---|---|---|
| DE | 3017667 | 11/1980 |
| DE | 8432519 U | 7/1985 |
| EP | 2932145 | 10/2015 |

OTHER PUBLICATIONS

European Search Report, EP 20159076, dated Jul. 13, 2020.

* cited by examiner

*Primary Examiner* — James M Hewitt, II

(74) *Attorney, Agent, or Firm* — Dekel Patent Ltd.; David Klein

(57) ABSTRACT

A pipe coupling assembly includes a band having an inner annular seal element wrappable around a pipe, opposing clamp members that extend from the band, at least one tightening element for clamping together the clamp members, and a bridge secured to the band with one or more bridge securing fasteners. The bridge spans a gap between the opposing clamp members. Anti-shearing structure is coupled to the bridge and the band, configured to prevent shearing or deformation of the bridge securing fasteners.

4 Claims, 2 Drawing Sheets

PIPE COUPLING WITH PROTECTION AGAINST FASTENER SHEARING

FIELD OF THE INVENTION

The present invention relates generally to pipe coupling assemblies, such as those used to sealingly connect pipes together or to repair breaks or leaks in pipes, and particularly for a pipe coupling with structure that prevents shearing of fasteners, such as rivets or screws.

BACKGROUND OF THE INVENTION

Many kinds of removable band-type couplings for pipes exist in the art. It is noted that throughout the specification and claims, the term "pipe" encompasses any kind of generally cylindrical object, and the terms "clamp" and "coupling" are used interchangeably.

FIG. 1 illustrates a prior art pipe coupling assembly 1. The assembly 1 includes a circumferentially continuous band 2 that has two ends separated by a gap. Band 2 goes around a sealing ring or rings 3. Clamping members 4 are secured to the ends of band 2. One or more tightening fasteners 5 (shown in broken lines) are used to tighten the two clamping members 4 to each other and sealingly press the seal 3 onto a pipe (not shown).

It is known to use a spanning element, known as a bridge or clamp bridge 6, in such couplings. The bridge 6 spans the abovementioned gap located at the tightening mechanism. The bridge helps keep the sealing ring or rings 3 in place when tightening the clamp. Bridge 6 is fastened to band 2 by means of one or more mechanical fasteners 7, such as screws or rivets.

A problem can occur upon tightening the tightening fasteners 5. The tightening action applies a radially-inward clamping force on the sealing ring or rings 3. Once the ring 3 is fully compressed on the pipe, further tightening force is applied to the tightening fasteners 5 to continue to bring the two clamping members 4 towards each other. This additional clamping force must be borne by the mechanical fasteners 7 that attach the bridge 6 to band 2. Sometimes the force is so great that mechanical fasteners 7 deform or even shear.

SUMMARY OF THE INVENTION

The present invention seeks to provide an improved pipe coupling assembly, as is described more in detail further below. In the present invention, the pipe coupling includes structure that prevents shearing of fasteners, such as rivets or screws, such as those used to secure a bridge to the band of the coupling.

There is provided in accordance with an embodiment of the present invention a pipe coupling assembly including a band having an inner annular seal element wrappable around a pipe, opposing clamp members that extend from the band, at least one tightening element for clamping together the clamp members, a bridge secured to the band with one or more bridge securing fasteners, the bridge spanning a gap between the opposing clamp members, and anti-shearing structure coupled to the bridge and the band, configured to prevent shearing or deformation of the bridge securing fasteners.

In accordance with an embodiment of the present invention, the anti-shearing structure includes a male and female connection between the bridge and the band.

In accordance with an embodiment of the present invention, the anti-shearing structure includes a protrusion that protrudes from the bridge and is received in an aperture formed in the band.

In accordance with an embodiment of the present invention, the anti-shearing structure includes an extension that is arranged to bear against a surface of the bridge.

In accordance with an embodiment of the present invention, an opening is formed in the bridge adjacent the anti-shearing structure.

BRIEF DESCRIPTION OF THE DRAWINGS

The present invention will be understood and appreciated more fully from the following detailed description, taken in conjunction with the drawings in which.

DETAILED DESCRIPTION OF EXEMPLARY EMBODIMENTS

Figure 1:
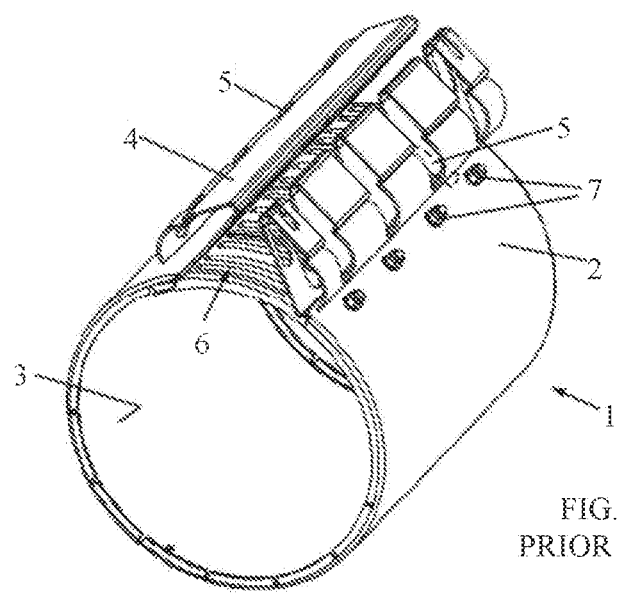
FIG. 1 is a simplified perspective illustration of a prior art pipe coupling assembly with a bridge.
Figure 2:
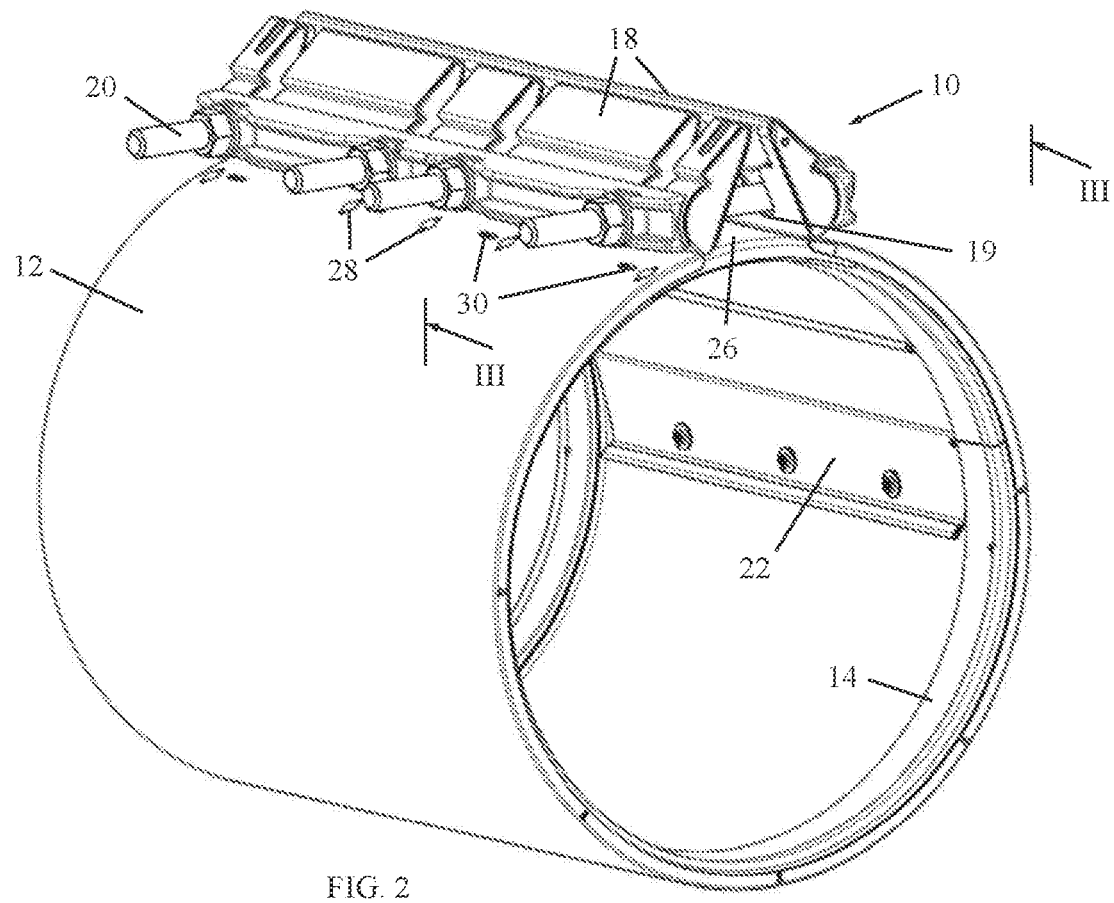
FIG. 2 is a simplified perspective illustration of a pipe coupling assembly, constructed and operative in accordance with a non-limiting embodiment of the present invention.

Reference is now made to FIG. 2, which illustrate a pipe coupling capsulation (or encapsulation) assembly 10, constructed and operative in accordance with a non-limiting embodiment of the present invention.

Assembly 10 includes a band 12 having an inner annular seal element 14 wrappable around a pipe (not shown). Band 12 is typically, but not necessarily, made of metal and annular seal element 14 is typically, but not necessarily, made of an elastomer, such as natural or synthetic rubber, e.g., EPDM (ethylene propylene diene monomer) or neoprene. In the illustrated embodiment, two annular seal elements 14 are provided, each one at opposite ends of the band 12. The annular seal element 14 may include a foldable seal, a multi-layer seal (whose layers may be separated and removed from each other to accommodate different diameter pipes), or other kinds of seals.

Opposing clamp members 18 extend radially outwards from ends of band 12 and are formed with mounting apertures 19. Clamp members 18 are clamped and tightened together with one or more tightening elements 20, such as but not limited to, bolts which are tightened by nuts.

In the illustrated embodiment, band 12 and annular seal element 14 are split. However, the invention can alternatively be carried out with a configuration in which band 12 and annular seal element 14 are constructed of two opposing halves.

In the illustrated embodiment, the pipe coupling assembly 10 includes a seal pressing device 22, disclosed in U.S. Pat. No. 9,151,419. However, the invention can be carried out without a seal pressing device.

A bridge 26 may span the gap located between the opposing clamp members 18. Bridge 26 helps keep annular seal element 14 in place when tightening the tightening elements 20. Bridge 26 may be fastened to band 12 by means of one or more bridge securing fasteners 28, such as screws or rivets. Bridge 26 may be made of a suitably strong, yet bendable material, such as but not limited to, stainless steel (e.g., AISI 304).

Figure 3:
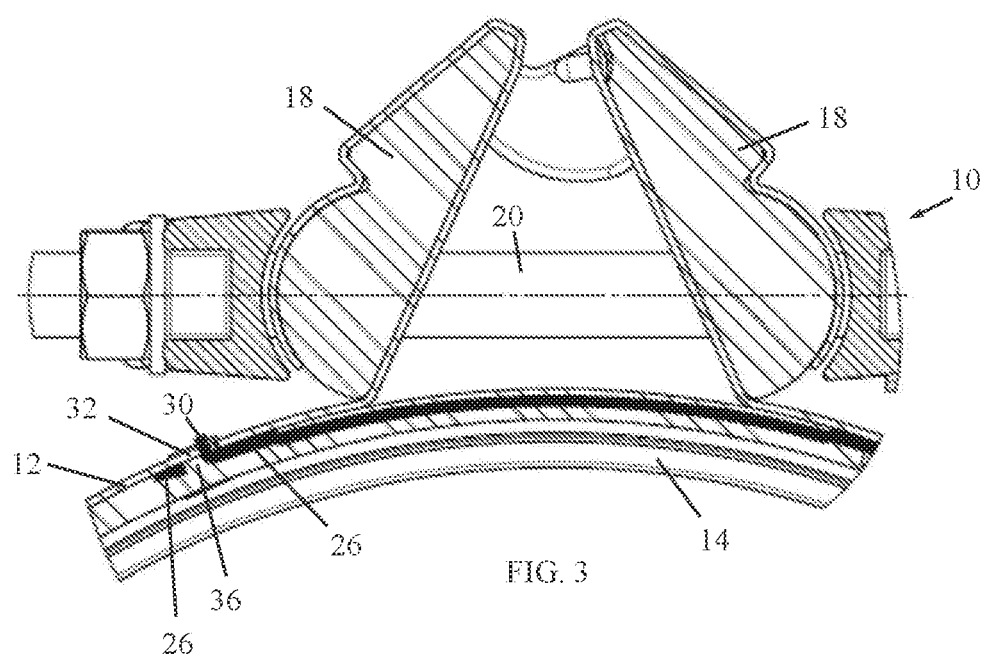
FIG. 3 is an enlarged sectional illustration of a portion of the pipe coupling assembly, taken along lines III-III in FIG. 2, showing a bridge and anti-shearing structure.

Reference is made additionally to FIG. 3. In accordance with a non-limiting embodiment of the present invention, the pipe coupling assembly 10 includes anti-shearing structure 30 coupled to bridge 26 and band 12 to prevent shearing or deformation of bridge securing fasteners 28. The anti-shearing structure 30 may include a protrusion or tab that protrudes from bridge 26 and is received in an aperture 32 formed in band 12. Alternatively, a tab may protrude from the band and be received in an aperture in the bridge. As another alternative, the anti-shearing structure 30 may include a male and female connection between bridge 26 and band 12.

Figure 4A:
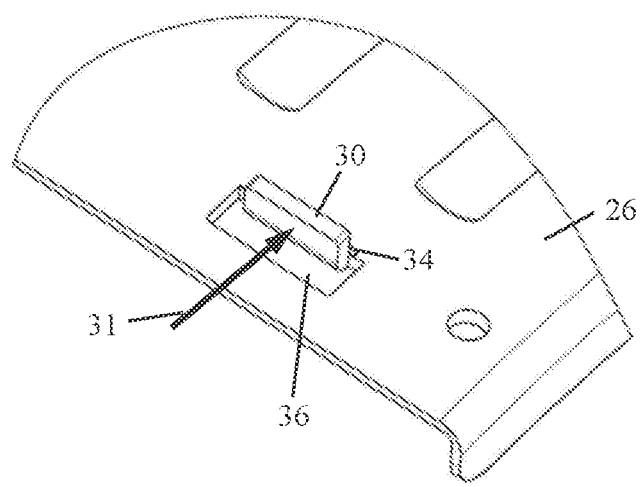
FIGS. 4A and 4B are enlarged illustrations of the anti-shearing structure, in accordance with a non-limiting embodiment of the present invention.

As seen in FIGS. 3 and 4A, the anti-shearing structure 30 may be formed, such as by punching and bending from bridge 26. This forming process may leave an opening 36 in the bridge 26.

Figure 4B:
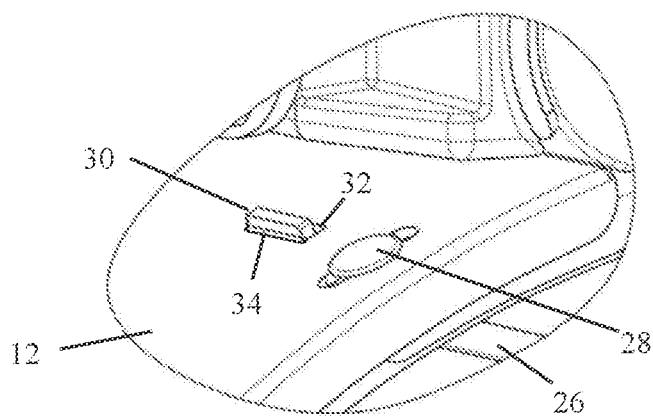

As seen in FIGS. 4A and 4B, the anti-shearing structure 30 may include an extension or leg 34 that is arranged to bear against the surface of bridge 26. The shearing forces 31 that are carried by anti-shearing structure 30 are indicated by arrow 31. The extension 34 provides significantly increased resistance to bending against the shearing force 31 by abutting against bridge 26.

What is claimed is:

1. A pipe coupling assembly comprising:
    a band having an inner annular seal element wrappable around a pipe, said band being cylindrical with a length and a circumference, said length extending along a longitudinal direction and said circumference extending along a circumferential direction perpendicular to said longitudinal direction;
    opposing clamp members that extend from said band;
    at least one tightening element for clamping together said clamp members;
    a bridge secured to said band with one or more bridge securing fasteners, said bridge spanning a gap between said opposing clamp members;
    anti-shearing structure coupled to said bridge and said band, configured to prevent shearing or deformation of said bridge securing fasteners, wherein said anti-shearing structure comprises a protrusion that protrudes from said bridge and is received in an aperture formed in said band, said protrusion and said aperture each having a length that extends along said longitudinal direction and a width that extends along said circumferential direction, said length being greater than said width, and wherein said aperture is longer and wider than said protrusion; and
    an opening formed in said bridge adjacent said anti-shearing structure.

2. The pipe coupling assembly according to claim 1, wherein said anti-shearing structure comprises a male and female connection between said bridge and said band.

3. The pipe coupling assembly according to claim 1, wherein said protrusion and said aperture are rectangular.

4. The pipe coupling assembly according to claim 1, wherein said anti-shearing structure comprises an extension that is arranged to bear against a surface of said bridge.

* * * * *